May 22, 1962 A. I. GRAY 3,035,443
CONDITION MONITORING DEVICE
Filed April 11, 1958 6 Sheets-Sheet 1

INVENTOR.
ARTHUR I. GRAY

May 22, 1962 A. I. GRAY 3,035,443
CONDITION MONITORING DEVICE
Filed April 11, 1958 6 Sheets-Sheet 6

FIG. 9

INVENTOR.
ARTHUR I. GRAY
BY
Leonard H. King

United States Patent Office 3,035,443
Patented May 22, 1962

3,035,443
CONDITION MONITORING DEVICE
Arthur I. Gray, 42 Eagle Lane, Levittown, N.Y.
Filed Apr. 11, 1958, Ser. No. 727,827
10 Claims. (Cl. 73—343.5)

The present invention relates to precision apparatus for monitoring a range of conditions and to actuate control means in accordance with selected conditions within said condition range. More particularly, the present invention is adapted to selectively actuate control means after a predetermined time of operation under selected conditions.

In particular, the present invention is adapted to record the time of operation of aircraft engines at various operating temperatures, where such time is in excess of empirically derived or calculated safe operating times within a particular temperature range.

While the specific embodiment of the present invention is herein shown as being applied to a temperature time recording device for jet engines, the invention has applicability to any temperature or other condition variable system, such as for example pressure, where an overall range of conditions obtains, and where it is desired to monitor and control the system by selectively subdividing this temperature, or other condition, range into bands, for the purpose of energizing control apparatus at such condition band intervals. As applied to temperature measurement, the device may be characterized as a multiple thermostat unit of extreme simplicity and compactness, adapted to be used to monitor discrete temperature bands, in contradistinction to thermostats set at a specific temperature point.

As will be hereinafter pointed out in detail, the device is adaptable for use in aircraft, where ruggedness, light weight, and simplicity of construction and servicing are of great importance, and where a wide range of ambient temperature variation may be encountered.

Aside from temperature measurement of jet engines, the invention has other temperature measurement application, such as chemical process automation involving temperature control. For example, it may be employed to actuate process control means at the predetermined finite time after a particular temperature has been reached by the material undergoing processing. While thermocouple means are disclosed as the primary temperature sensing means, other temperature sensing means such as optical or resistance devices may be employed in carrying out the invention or still other appropriate condition sensing devices may be employed.

A feature of this invention is the versatility in accurately measuring a time at a particular temperature or within a temperature band prior to actuation of a controlled means. The controlled means may be a timer or the aforementioned process control device.

In the operation of jet aircraft, requirements of maximum efficiency or demands for high thrust operation as in military applications, compel that engines be operated at temperatures as close as possible to the safe limit for the power plant employed.

Exposure of turbine engine blades to excessive temperature can result in structural damage that causes loss of efficiency and power and which may lead to reduced life or destruction of the engine, and endanger life of personnel. Since presently known techniques render it impractical to directly measure the temperature of the turbine blade, it is current practice to measure the temperature of the gas at the turbine inlet or at the turbine exhaust. A device for measuring turbine gas temperature is disclosed, for example, in the copending application of Harold Koletsky entitled "Temperature Indicating System," Serial Number 513,312, filed June 6, 1955, now U.S. Patent 2,877,650.

In military operations it is conventional practice to maintain a log of overtemperature operation, as gaged by the measurement of engine gas temperatures. Based on this record and on operational experience, service personnel can determine whether or not an engine need be replaced, overhauled or merely carefully inspected. By "overtemperature" is meant any temperature which exceeds normal operating temperatures for a given condition of engine operation. Overtemperature in itself is not necessarily cause for removal of an engine for overhaul or replacement. It is rather the time duration of these temperatures that will determine the extent of the damage, so that at relatively low temperatures a longer period of such time is permissible than at high temperatures. This relationship of over-temperature and corresponding permissible time periods may be graphically shown.

In the operation of jet engines, the problem of temperature recording is made difficult by the fact that a very wide range of temperatures is encountered, namely from ground temperature, at the time of a cold start, to a temperature of close to 1000° C. at the other extreme. This temperature fluctuates rather widely during operation, from ground temperature, at start, to about 950° C. for the warmup phase, then down to about 700° C. under normal flight conditions and then to the higher ranges again approaching 950° C., under extreme conditions such as experienced under combat conditions. If the temperature range from 690° to 1000° C. were divided into temperature regions or bands, for example, the bands 690°–720°, 720°–750°, 750°–800°, 800°–850°, 850°– 1000°, it would be found that the engine could operate safely for progressively shorter intervals in each temperature band of a successively higher order.

By experiment, calculation or estimate based on experience, the safe operating time at various temperature ranges for a particular engine could be determined. For example, a particular hypothetical engine could operate safely almost indefinitely under 690° C. but could operate safely for only a few seconds at a temperature of about 950° C. Within the selected temperature bands, any time periods of operation beyond the safe period for that given band is considered an "overheat" for that band and could result in serious damage to the engine, thereby endangering the life of personnel. Thus all time periods of overheat in the given temperature band must be recorded, while for practical purpose the safe period for that band can be left non-recorded. Thus as employed hereinafter the term "overheat" is distinguished from the term "overtemperature."

The existence of overheat is recognized as almost inevitable under the condtions of operation of jet aircraft. Under conditions of military emergency, the engines must be operated at temperatures as close as possible to the safe limit to the power plant employed, and this safe limit is frequently exceeded. A record of the time duration of overheat operation in particular temperature bands is essential for maintenance personnel, as they are thereby enabled to determine whether the engine is to be carefully inspected for eveidence of damage, overhauled, or whether it is unserviceable or likely to be dangerous and should therefore be scrapped.

A time temperature recorder, therefore, to be of service to maintenance personnel, must accurately record all overheat time, that is the time beyond the preliminary safe time interval of overtemperature for that particular temperature band, leaving it thereafter to the maintenance personnel to determine whether this period of recorded overheat represents a salvageable period of overheat or whether it represents an indication of unserviceability for the given jet engine. It is to be noted that by eliminating the safe period from the record, the work of ground personnel is greatly simplified, as this period is irrelevant to their decision. Further and more importantly the record is made more meaningful as a brief period of overtemperature operation is not an important factor.

For the safety of the pilot, the device furthermore, should be adapted to provide a warning signal as by actuating a signal flag on the aircraft instrument panel to warn the pilot of critical overheat conditions so that safety measures can be promptly taken.

It is therefore, an object of the present invention to provide means for determining and recording the operating time of engines or similar equipment in excess of predetermined allowable periods, by providing recording means for a plurality of temperature ranges.

A further object of the present invention is to provide improved instrumentation and control means for temperature-variable systems, whereby an overall temperature range can be selectively subdivided into a plurality of temperature bands for appropriate monitoring and control of equipment operating within that temperature band.

Yet another object of the present invention is to provide automatic recording means for monitoring conditions within specified operating ranges, and providing a visual indication thereof.

Yet another object of the present invention is to provide means for automatically signalling conditions of overheat.

It is still a further object of the present invention to provide external adjustable means for a device of this type whereby an adjustable time delay of a high order of precision can be provided for a hermetically sealed control device.

A feature of this invention is to provide a hermetically sealed time delay mechanism.

It is still a further object of the present invention to provide extremely compact and lightweight recording means of rugged construction, adapted to be used in aircraft.

It is a further object of the present invention to provide resettable precision recording means having controlled access to the reset means.

Other objects and advantages will be in part pointed out with particularity and in part will become apparent from the following description and accompanying drawings appended thereto, and the appended claims.

Figure 1:
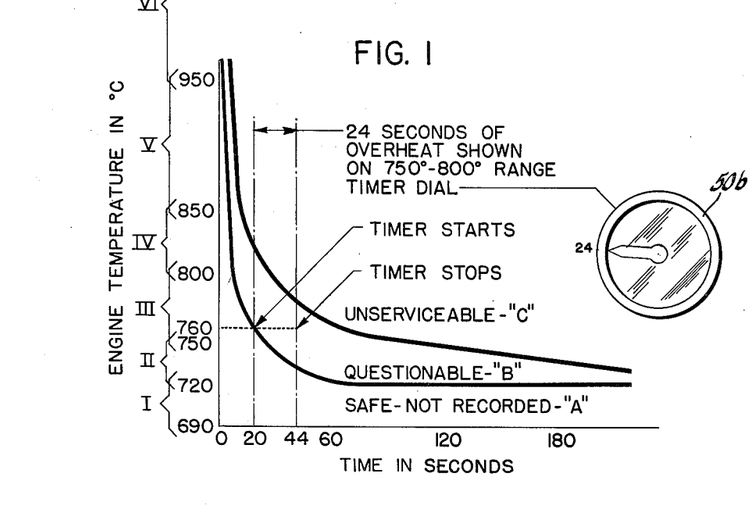
FIGURE 1 represents a time-temperature curve for a typical jet engine and indicates the application of the curve to a servicing procedure.

Referring now to the drawings, there is shown in FIGURE 1 an overtemperature curve, wherein the time in seconds of operation is plotted against the engine temperature in degrees centigrade. In a preferred embodiment of the device of this invention, six temperature bands are monitored. The temperature bands selected for monitoring are 690°–720°, 720°–750°, 750°–800°, 800°–850°, 850°–950° and over 950°. It will be understood that different ranges can be covered as desired for various applications of the device and are designated on the drawings by the numerals I, II, III, IV, V and VI. In the present device, a time record is kept in seconds of overheat operation in the first five temperature bands by a clock for each band. Temperatures of over 950° are monitored by a warning flag, as the allowable safe time interval is too brief to warrant recording. While the curve of FIGURE 1 indicates a spread in time range between the lower and upper limit of each band, it has been found that a satisfactory degree of accuracy can be attained by monitoring the band in terms of a single time value. Thus the time recorder units, to be described in detail hereafter, are activated individually at the lower temperature value for each selected band, and provide a single overall recorded time interval for operation in the selected band and at all higher temperatures.

There are shown in FIGURE 1 three time-temperature regions. Region A, the safe period, is not recorded and the individual time recorder remains in the standby or non-operative condition. After a time delay corresponding to this safe period has elapsed the overheat recording commences. This time delay period is adjustable, and is inserted into the unit as described in greater detail hereinafter. The overheat region comprises areas B and C. While the device gives a single reading which includes the sum of B and C, the extension of time beyond area B automatically classifies it as area C.

It is an important feature of the present invention that the time delay for the safe period is adjustable. Thus, the device can be adjusted to function with a new set of parameters as required by changing conditions or knowledge gained from additional experience.

The time temperature curve of FIGURE 1 is plotted for a typical jet engine, and illustrates the case where the engine had operated for a period of 44 seconds at a temperature of 760 degrees. The safe period at this temperature is considered 20 seconds, and is not recorded. If the aircraft had operated for 2 minutes at this temperature, there would have been an overheat record of 100 seconds, namely 120 seconds minus the 20 second safe period. It will thus be seen from FIGURE 1 that the 24 second overheat leaves the engine in the serviceable region, namely region B, while the 100 second overheat would be in region C, and would represent an assumed permanent damage to the engine, classifying it as unserviceable. It should be noted that this record is prepared automatically, and not by logging on the part of the pilot. Therefore human error is obviated and also the pilot is freed from this complex task.

Figure 2:
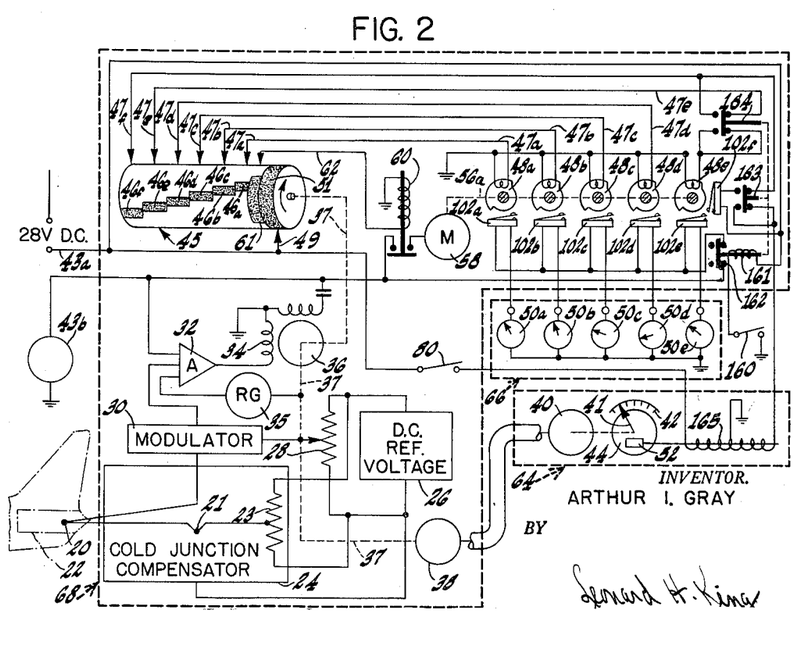
FIGURE 2 shows a schematic diagram of the apparatus of this invention as embodied in an aircraft temperature sensing and overtemperature recording device.

Referring now to FIGURE 2, there is shown schematically the overall operation of the device as embodied in a temperature measuring device. A thermocouple 20 is positioned so as to detect temperatures, in say, the tailpipe 22 of a jet engine, so as to measure the temperature of the exhaust gas at that point. Obviously, the thermocouple could be placed in still other locations. Thermocouple means for measuring temperature are convenient to install and are currently preferred although other means are applicable to this invention. The thermocouple temperature measuring system employed is preferably of the type described in the application of Harold Koletsky, "Temperature Indicating System," Serial Number 513,312 filed June 6, 1955, now U.S. Patent 2,877,650. This thermocouple is preferably of chromel-alumel, and provides a potential difference when connected to cold junction 21. Cold junction 21 is connected to a temperature sensitive resistor 23 which in turn is connected in parallel with a constant voltage source 26. Resistor 23 and cold junction 21 are mounted together forming cold junction compensator 24. A suitable compensator for this purpose is disclosed in the above referenced application of Harold Koletsky.

A D.C. reference voltage provided by constant voltage source 26 is balanced by means of potentiometer 28 against the output of the series circuit formed by the thermocouple measuring junction 20, cold junction 21 and the resistance network 23 of cold junction compensator 24. The difference between the D.C. reference voltage and the thermocouple circuit output voltage is translated by modulator 30 into an output signal and applied to the input of amplifier 32. The resulting amplified signal is then applied to the winding 34 of servo motor 36. Through gear train 33, shown in FIGURE 6, motor 36 actuates shaft 37 to which is coupled the arm of potentiometer 28. The motor drives the potentiometer in a direction tending to minimize the error signal from modulator 30, thus closing the conventional servo loop.

In the balanced condition, the output from the thermocouple arm is equal to that of the output from the reference voltage arm, therefore there is no signal passed to the modulator and no shaft rotation imparted by the motor 36.

In the unbalanced condition, the angle of rotation of the shaft 37 will correspond exactly to the temperature being sensed. A chopper in the modulator 30 is employed to convert the D.C. voltages of the balancing arms into A.C. voltages which is applied to the otherwise conventional modulator circuit.

Figures 3, 4, 5:
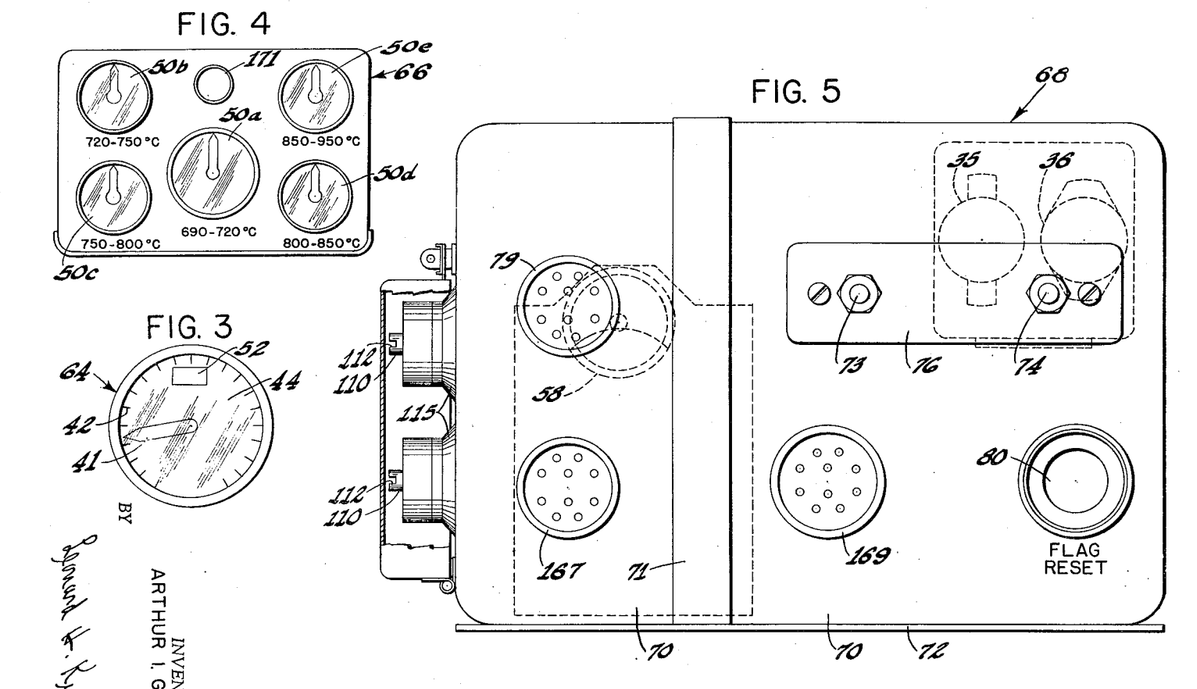
FIGURE 3 is a front view, in elevation, of an indicating means suitable for installation on an aircraft instrument panel for indicating a sensed condition.
FIGURE 4 is a front elevational view of a remotely located time-condition recording equipment employed in one embodiment of this invention.
FIGURE 5 is a side view in elevation, of a unit containing a temperature measuring and time delay apparatus having externally accessible time delay adjustment means, with a protective cover for the adjustment means shown partially broken away so as to expose the adjustment means.

For increased stability the present invention utilizes a rate generator 35 which is connected to motor shaft 37 and produces a voltage proportional to the speed of the shaft. This voltage is fed back to the amplifier 32 in such a way as to oppose the rotation of the motor 36. This produces damping and tends to stabilize the system. Shaft 37 is coupled to the rotor of synchro transmitter 38, by coupling 39, shown in FIGURE 6. Transmitter 38 is connected to repeater unit 40 through conventional cabling means. The synchro type repeater unit 40 rotates an indicator pointer 41 which in combination with indicia 42 on dial face 44, provides a visual indication of temperature. This indicator is normally positioned on the airplane instrument panel (FIGURE 3).

Shaft 37 rotates insulated from 45 which carries conductive segments 46a–46f, and 61 on its periphery in offset relation, as indicated in FIGURE 2. These are energized by slip ring 51, which is electrically connected to 28 v. D.C. source 43a by brush 49. Slip ring 51 is connected to all of the conductive segments, as indicated in FIGURE 2.

It will be understood that the components of the temperature sensing circuit and the servo-motor circuit are selected so that shaft 37 will describe a rather large angle of rotation in correspondence to the temperature range being monitored, with a maximum rotation of course being 360°. Since the total angle of rotation of the shaft is equivalent to the overall temperature range being monitored, this angle can be subdivided to correspond to selected fractions of this overall range.

Figure 6:
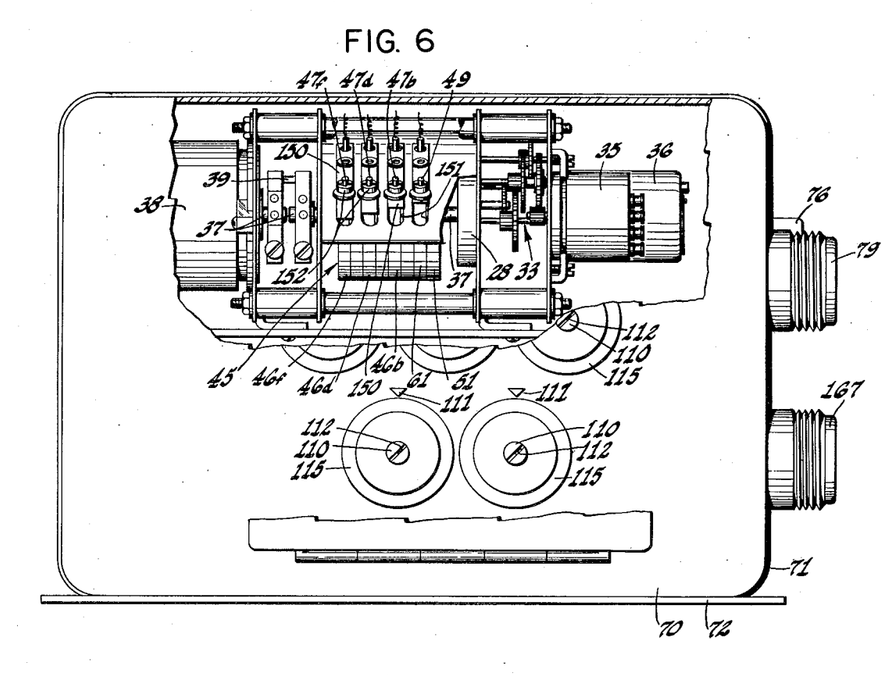
FIGURE 6 is a front view in elevation, of the apparatus shown in FIGURE 5 partially cut away so as to expose a self-balancing servo mechanism and condition band selecting means.

In the embodiment of the invention as illustrated in FIGURE 6, segments 46a–46f correspond to selected temperature bands within that range. These band-segments 46a–46f are individually connected to timing circuits by takeoff brushes 47a–47f, which contact the segments individually, in sequence. The brushes 47a–47f, 49 and 62 are individually mounted on insulators 150 which are mounted so that they slide along slot 151 circumferentially with respect to drum 45. Locking means 152 secure the brushes in the desired location so that the brushes accurately engage the conductive segment of drum 45 at precisely the shaft angle corresponding to the specific temperature at the lower end of the selected temperature band. The segment may be formed by conventional commutator techniques to be of precisely the proper dimension to permit recording of the temperature within a particular temperature band.

In FIG. 2 there is shown drum 45 provided with a plurality of segments 46a to 46f. It will be noted that the conductive segments are arranged so as to provide overlapping coverage so that the corresponding recording means for a given band will record temperatures extending into the lower part of the adjacent band. The segments' lengths may be extended to record or provide control over a broader band as, for example, to sense all temperatures within the principal band at which recording is initiated, as well as all higher temperatures. Likewise, a particular segment may be dimensioned so as to record temperatures only within a particular band. It will be noted that segment 61 extends over a distance greater than the range covered by all of the segments 46a–46f.

For a temperature within the monitored range a brush will contact a segment and thus become energized. A follow-up circuit associated with each of these takeoff brushes will be energized for that same time period. Hence the present device is adapted to be used with a wide variety of instrumentation and control mechanisms where it is desired to operate these mechanisms whenever there exists a selected temperature or other condition. The specific embodiment shown of the present invention is that of a time recorder, whereby a set of clocks is provided to record the duration of each temperature band. As previously stated, the entire duration need not be recorded, therefore time-delay means, to be described in greater detail hereinafter, are provided to keep the clocks in a non-recording status during the "safe" period of each temperature band. However, for other applications the entire time duration can be monitored.

System diagram FIG. 2 indicates in dotted outline the three casings used to house the components of the discussed embodiment of present invention. Thus outline 64 of FIGURE 2 represents the indicating instrument on pilot's instrument board, shown in frontal elevation in FIGURE 3. FIGURE 3 shows the pointer 41 adapted to sweep over indicia 42 formed on dial face 44.

Outline 66 of FIGURE 2 indicates the timer housing, shown in frontal elevation as FIGURE 4. As explained previously, the timer comprises a bank of clocks which record in seconds the amount of overheat in each temperature band, beyond the safe period. Five clocks are shown, one for each of the five lower bands. When the sensed condition is within band VI, i.e., over 950° C., there is activated a warning flag 52, which appears from behind a cut-out on dial face 44 (FIGURE 3).

Outline 68, of FIGURE 2, corresponds to the main assembly of the device, shown in FIGURE 5. As indicated schematically in FIGURE 2 this assembly includes the modulator section 30, the amplifier section 32, the commutator drum 45 and associated wipers and the time delay relays. These components are housed in a hermetically sealed container 70, formed in a preferred embodiment of a drawn aluminum shell and provided with a mounting plate 72. This plate is in turn, mounted on conventional aeronautical type shock mounts (not shown). A conventional soldered on tear strip 71 is provided to give access to the interior of container 70 for inspection and servicing. Input leads from the airplane power supply are brought into casing 70 by connector 79 which is of the hermetically sealed type. The leads are connected to a 28 volt D.C. source 43a for the powering of relays, and to a 115 volt 400 cycle A.C. source 43b for powering the amplifier and servo motors. Still other pins of this connector are employed for making connections to temperature indicator 64 which is remotely positioned, as previously explained.

Thermocouple sensing junction 20 is connected to the unit by means of terminals 73 and 74 which are mounted on an insulating board 76, shown in FIG. 5. A chromel-alumel couple has been found suitable for this purpose. The terminal studs are made of the same metal as the thermocouple and thermocouple leads to avoid introducing a secondary junction. That is, in this embodiment one terminal is of chromel and the other of alumel.

The electronic components indicated in block form in FIGURE 2, namely modulator, amplifier and D.C. reference voltage source, are standard components well known in the art, hence are not described in detail herein. The position of servo motor 36 and associated rate generator 35 is indicated in outline in FIGURE 5. The servo motor 36 and rate generator 35 are coupled together by gear train 33 as shown in the cut-out section of FIGURE 6.

Servo motor 36 rotates shaft 37 through gear train 33. As shown in the cut-out section of FIGURE 6, insulated drum 45 rotated by shaft 37 carries ring 51 and segments 46a–46f and 61 of which 61, 46b, 46d and 46f are visible. The other segments are on the opposite side of the drum and are connected to each other by internal leads.

As shown in FIG. 2, the conductive segments 46a to 46f are arranged so as to provide overlapping coverage so that the corresponding recording means for a given band will record temperatures extending into the lower part of the adjacent band. The segments' lengths may be extended to record or provide control over a broader band as, for example, to sense all temperatures within the principal band at which recording is initiated, as well as all higher temperatures. Likewise, a particular segment may be dimensioned so as to record temperatures only within a particular band. Slip ring 51, through its associated takeoff brush 49, is connected to the D.C. source 43a and is adapted to energize the other segments carried by the drum. As stated previously, the takeoff brushes are adjustable with regard to the axis of rotation of the shaft, hence the radial angle at which contact is made can be adjusted. This assures that the individual takeoff brush is energized at precisely the moment the corresponding temperature band is being sensed.

In the present device, these takeoff brushes are arranged to initiate a chain of events which finally results in the energizing of individual recording units, clocks 50a–50e. These clocks will record the period in seconds that each of the associated segments are energized. However, the device of the present invention provides for the insertion of a time delay that is adjustable for each of the temperature bands so as to regulate the instant that the individual clocks begin to record. This is necessary to eliminate the safe period from the clock record. It should be pointed out that this time delay adjustment must come into operation as soon as the individual commutator segments are energized. That is, it must be under the control of the commutator segment for accuracy and foolproof operation. Therefore, the time delay adjustment involves incorporating a series of mechanical delay means, each of which will be operated by the electrical energization of a commutator segment.

As shown in FIGURE 2, the time delay mechanism includes a shaft 56 rotatable by constant-speed motor 58. Shaft 56 and asscoiated coupled shafts 65 and 69 carry the time delay assemblies 48a–48e. In the drawing the numeral 56a is used to generally designate the assembly of shafts. It is a feature of the present invention that motor 58 does not rotate continually, but operates only when the temperatures approach the range where monitoring is to begin. This is accomplished by relay 60, which is energized by brush 62 contacting segment 61 and is thereby closed only when the monitored bands are approached. Operating motor 58 intermittently thus prolongs the life of this unit.

It will be noted that segment 61 covers a greater circumferential distance than covered by segments 46a–46f so that relay 60 is closed at all times that segments 46a–46f are being contacted.

Figure 7:
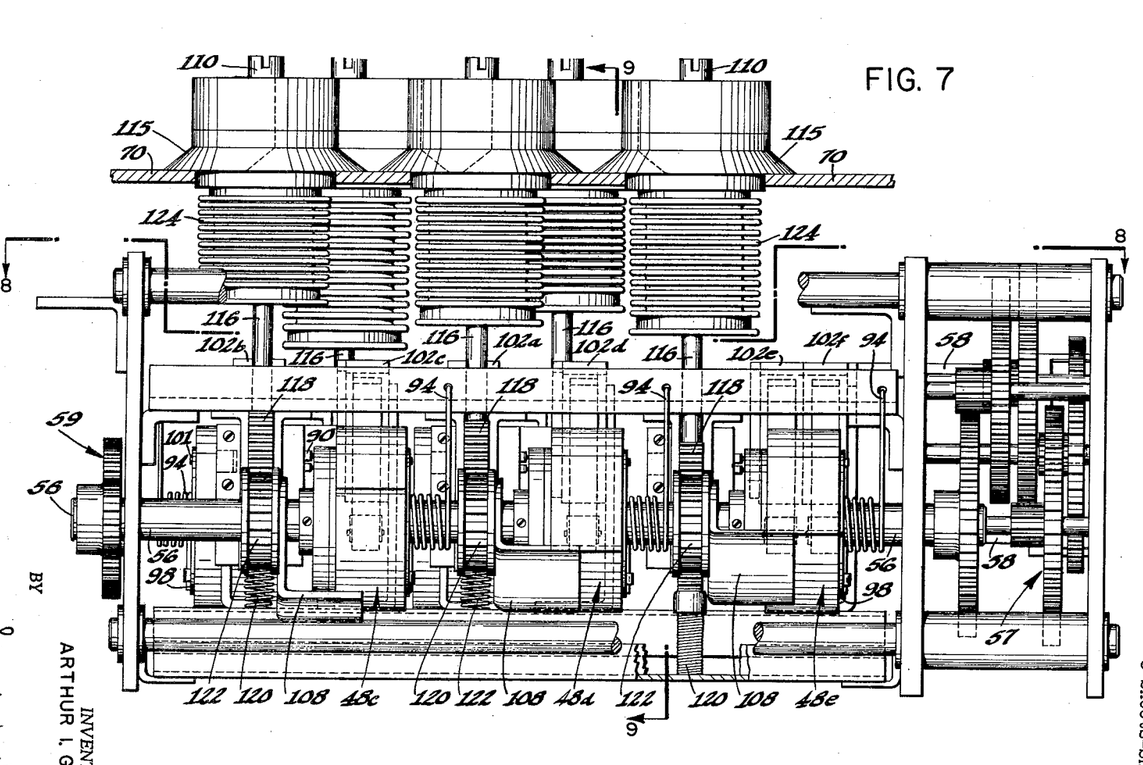
FIGURE 7 is an enlarged view, partially broken away, of the time delay mechanism shown in outline in FIGURE 5 with the adjustment means positioned uppermost.
Figure 8:
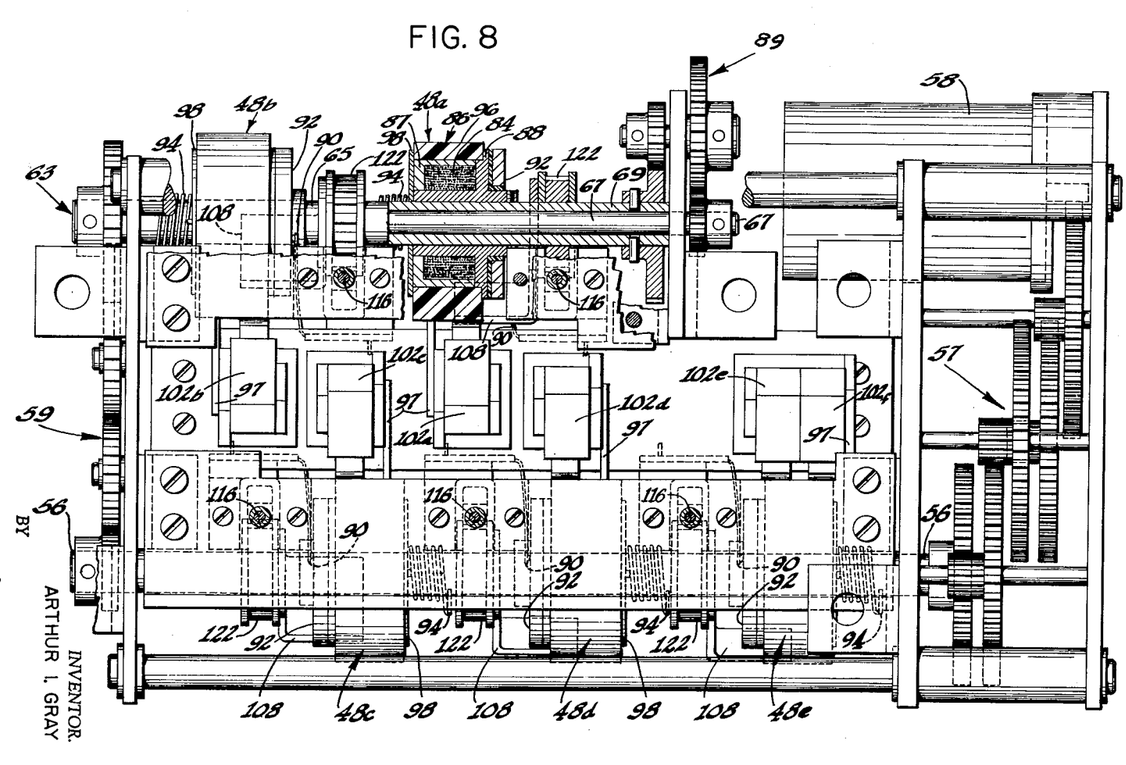
FIGURE 8 is a partially broken away plan view of the time delay mechanism of this invention taken along line 8—8 of FIGURE 7.

As shown in FIGURES 7 and 8, motor 58, through gear reduction train 57, drives shaft 56. At its other end shaft 56, by maens of gear reduction train 59, drives a stepped shaft designated generally as 63, said shaft having a portion of one diameter 65 and a reduced diameter portion 67. To the reduced portion 67 there is coupled gear reduction train 89 which in turn drives hollow shaft 69 as shown in FIGURE 8. Hollow shaft 69 is concentric with and slidably mounted on the reduced diameter portion 67 of shaft 63 and rigidly supports time delay member 48a. Time delay member 48b is rigidly mounted on the larger diameter portion 65 of shaft 63 and time delay members 48c, 48d and 48e are, in turn, rigidly fixed to shaft 56. The use of the coaxial shaft permits a compact arrangement of parts. The object of the gear train and shaft assembly just described is to permit time delay member 48a to rotate more slowly than any other time delay member, 48b–48e. Likewise, time delay member 48b is permitted to rotate faster than time delay member 48a but slower than 48c–48e, mounted in shaft 56. By a slower rotation a longer time delay is introduced. Member 48a is therefore adapted to operate in the lower temperature bands where a longer safe period exists, as previously explained. Therefore, a correspondingly longer time delay is introduced.

FIGURE 8 shows in cross section the construction of a time delay member, here designated as member 48a. Member 48a comprises coil 84 and a magnetic clutch assembly 86 actuated thereby. Coil 84 is disposed about magnetic core member 88 which is rigidly fixed to shaft 69. Segment 46a is electrically connected to coid 84 by means of brush 90 and slip ring 92. Energization of the coil will pull pole piece 87 of clutch assembly 86 against core member 88 and the clutch will thereafter rotate with the shaft 69. It will be understood that similar brush and slip ring assemblies connect the other coils to their respective commutator segments 46a–46f.

Figure 9:
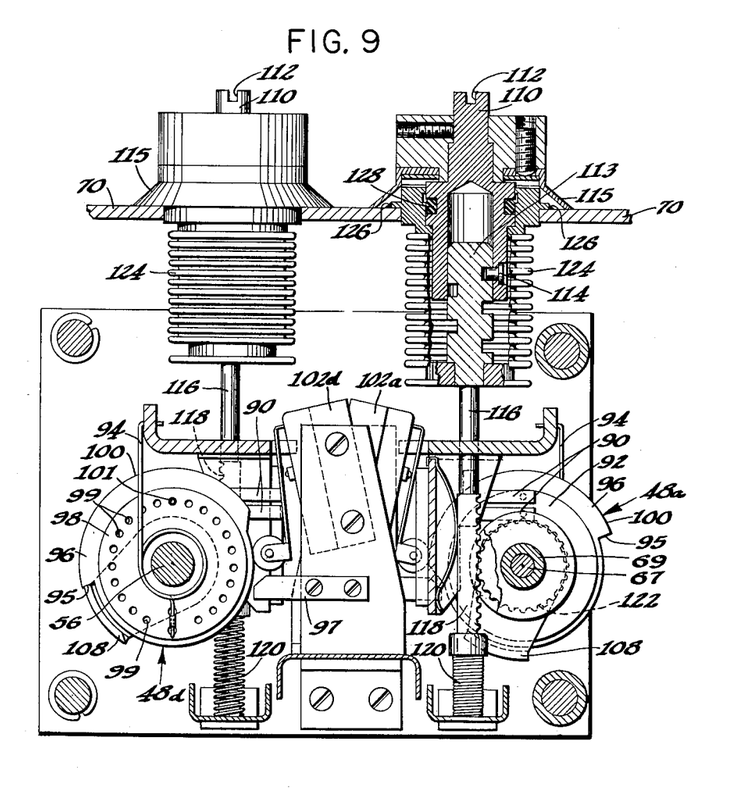
FIGURE 9 is a sectional end elevation taken along line 9—9 of FIGURE 7.

Nylon cam 96 is rigidly fastened to the periphery of pole piece 87 and hence rotates with the shaft 69 when the coil 84 is energized. As cam 96 rotates, cam face 100, formed on the periphery thereof, abuts against switch 102a which is thereby closed, as shown in FIGURE 9. This completes a circuit to electrical clock 50a which commences the timing for that particular temperature band. Switch 102a remains closed by the abutting periphery 100 of cam 96 and the amount of time that the switch is closed will therefore represent the overheat period. The travel time for the rotation of cam periphery 100 will normally be adequate for the temperature band involved. However, should there be an unusual extent of overheat and the cam run on past the normal extent, fixed stop member 97 engages the cam holding it in continued abutting relation to switch 102 for the period of this overheat. It will be understood that in this position the pole piece 87 of the magnetic clutch member is constrained to slide against the frictionally engaged surface of core member 88 instead of being rotated therewith. Torsion spring 94 acts to restore the clutch assembly 86 so that face 95 of cam 96 is repositioned against adjustable stop member 108. Means are provided to permit adjustment of the tension of the spring 94 so that it does not override the action of the rotating shaft and the coupling force of the magnetic path of the clutch assembly. The tension adjusting means includes spring 94 which has one end secured to a support plate by insertion of the end into a hole in the plate. The other end is fastened to a perforated disc 98. One of the perforations 99 engages a pin 101 extending from clutch assembly 86. The tension may be varied by using a different perforation to engage pin 101.

Since the entire time period for a particular sensed condition would be recorded upon the closure of switch 102a, a mechanical time delay is inserted to retard the cam movement which activates this switch. This time delay as explained previously, corresponds to the safe period for the temperature bands. This is accomplished by stop member 108 which adjusts the position of cam face 95 relative to the angle of rotation, thus delaying the time of closure of switch 102.

Thus, in order to increase the duration of time at which a condition exists before a given timing period starts, stop member 108 is rotated so as to adjust the starting point for the cam, thus requiring either a shorter or longer period of travel which in turn results in the desired time delay period. The method of moving stop member 108 to accomplish this goal is described in detail hereinafter.

As shown in FIGURE 9, stop member 108 is externally adjustable by means of shaft 110. Shaft 110 is adapted to receive conventional screw driver means in slot 112. The turning of shaft 110 causes the corresponding raising or lowering of threaded slug member 113 which engages stud 114. Dial 115 is marked to register with indicia 111 (shown in FIGURE 6) with calibrated time settings. As shown in FIGURE 9, shaft member 16 serves to raise or lower rack 118 against the thrust of spring 120. In turn rack 118 rotates gear 122, to which is affixed stop member 108. Thus the turning of shaft 110 effectively adjusts stop member 108 with respect to time calibration settings on dial 115.

Shaft 110 terminates exteriorly of casing 70, therefore hermetic sealing means are provided to maintain the airtight condition of the components within the casing. This is accomplished by metal bellows 124 which is closed at the lower end and sealed to casing 70 at the upper end by solder means 126. An O-ring 128 is used for purposes of sealing off the interior of the bellows. As slug 113 is moved upwardly or downwardly, shaft 116 follows.

It will be understood that the foregoing description of the construction of individual time delay mechanism 48a will correspond to that of the construction of the other time delay mechanisms in the bank 48a–48e, as illustrated in FIGURE 2. Switches 102a–102e, when closed, start electric clocks 50a–50e respectively, the said clocks halting operation as soon as the switch is open, thereby providing appropriate time recording means.

Switch 102f, which like switch 102e, is actuated by the action of time delay 48e is normally deenergized. Switch 102f does not actuate a clock mechanism but instead, operates a warning flag device 52, which appears as a cut-out in dial face 44 in the pilot's instrument panel, thus warning the pilot of an extreme overheat condition only during starts, i.e. above 950° C. Flag indicator 52 is a bistable device which may be reset by closing of switch 80. It will be noted that the push button of switch 80 is located on box 70 so that it is inaccessible to the flight personnel and can be reset only by authorized personnel.

However, at the time of starting the engine there will be a transient high temperature of exhaust gas, in the neighborhood of 1000° or higher. This is not to be recorded because temperature limits for starting may be very liberal since the turbine wheel, under condition of a cold start, will not actually reach a temperature sufficient to cause damage from the overheat until a certain amount of time has elapsed.

For the typical engine of this example this safe time has been estimated to be two seconds at 950° C. Therefore, means are provided for preventing of the recording of overheat time or of actuation of signal flag 52 until the predetermined safe period is exceeded. Accordingly there is provided a switch 160 which is suitably linked to the conventional aircraft engine starting control (not shown). As the engine starting control is activated switch 160 is closed, thereby energizing solenoid 161 which causes ganged double pole-double throw switches 162, 163 and 164 to open one pair of contacts and close the other. This has the effect of energizing time delay relay 48e from wiper contact 47f so that a two second time delay is obtained before switch 102f is closed. Closing of switch 102f energizes one half of bistable relay winding 165 directly from the 28 volt D.C. source 43a instead of through drum 45 and wiper 47f.

The flight personnel have access only to the indicator; the control unit and recording units are normally located in a hatch to which only ground maintenance personnel have access. Thus reset of the flag by pressing of reset button 80 to energize the other half of winding 165, or reset of the timing clocks by pressing of button 171 (FIGURE 4) is readily restricted to authorized persons. Resettable electric timer movements are well known to the art and need not be described herein.

Routine servicing checks may be made by injecting test signals into the device, using monitor terminal 79 having pins connected to the wipers and other desired test points thereby permitting testing without disturbing the hermetically sealed condition of the unit. For repairs, tear strip 71 is removed. Conventional cabling means are employed to couple the components in unit 68 by means of terminals 167 and 169 to power sources 43a and 43b, indicator synchro 40, switch 160 and the timing clocks 50a–50e.

There has thus been provided in accordance with the present invention a device adapted to monitor temperature bands with a view to obtaining a time duration record for each band, after a selected time-interval has elapsed. Other applications in the field of temperature-monitoring, and various changes and modifications in the device will suggest themselves to those skilled in the art, without departing from the spirit and scope of the present invention.

I claim:

1. An apparatus comprising: means for sensing a condition within a spectrum of related conditions and providing a first signal indicative of the condition sensed; means responsive to said first signal for producing second signals indicative of selected bands of said spectrum; a plurality of signal responsive means arranged to be selectively actuated in response to particular indicative second signals; a plurality of time delay means, each having a preselected time delay, one of said time delay means being interposed between each of said signal responsive means and said signal producing means; said time delay means being responsive to said second signals to delay the actuation of an asosciated one of said signal responsive means for an initial predetermined period of sensing of signals within a selected band.

2. The apparatus of claim 1, wherein the signal responsive means comprise independent means for indicating the summation of the duration of all successive ones of each of said second signals exclusive of the predetermined time delay period.

3. The apparatus of claim 1, wherein said means responsive to said first signal comprises a commutator; means for automatically varying the position of said commutator in accordance with said first signal so that the position of said commutator is indicative of said sensed condition; a plurality of commutator segments carried by said commutator, the length of each of said commutator segments being indicative of the extent of the condition band, a respective one of said commutator segments being interposed in series between said condition sensing means and a respective one of said time delay means; means for energizing said commutator segments from a source of electrical energy; and a take-off contact disposed proximate to each of said commutator segments whereby each of said take-off contacts are wiped and energized by a respective one of said commutator segments.

4. The apparatus of claim 1, wherein said plurality of time delay means include in combination: a substantially constant speed motor; a shaft; a gear train arranged to couple said shaft and said motor; a plurality of cams positioned on said shaft and arranged so that said shaft is normally free to rotate independently of said cams; electrically energizable coupling means associated with each of said cams and said shaft so that said cams are rotatable with said shaft when said corresponding electrically energized coupling means is energized by a said second signal; engaging means carried by each of said cams; switching means arranged to be actuated by said engaging means when one of said engaging means is carried to a pre-determined point by the rotation of a given one of said cams to energize said signal responsive means; means for varying the rotational angle of said engaging means relative to said switching means so as to vary the time period between the energization of said coupling means and the time said engaging means actuates said switching means.

5. The apparatus of claim 4, wherein said varying means comprises a gear rotatably mounted on said shaft, an arm carried by said gear and arranged to engage said cam so as to limit its rotational movement in a first direction, a rack member engaged with said gear, spring means engaging said cam and arranged to rotate said cam in said first direction so as to return said cam to an initial starting position against said arm when said coupling means is in a deenergized state.

6. The apparatus of claim 5, wherein the said time delay means are enclosed within a continuous shell including an expansible bellows portion for each time delay means, said bellows being closed at one end, means extending from said closed end of said bellows engaging said rack so that the position of said rack varies with the expansion and contraction of said bellows, means positioned external of said continuous shell for varying the degree of expansion of said bellows so as to vary the period of time delay of the corresponding time delay means.

7. The apparatus of claim 4, including a second shaft, a gear train coupling said first-mentioned shaft and said second shaft and arranged to rotate said second shaft at a reduced rate of speed relative to said first-mentioned shaft, and additional cams carried by said second shaft.

8. The apparatus of claim 7, including an additional shaft coaxial with one of said first-mentioned shafts, a gear train coupling said coaxial shaft and said first-mentioned shaft so as to drive said coaxial shaft at a reduced rate of speed relative to said first-mentioned shaft, and additional cams carried by said coaxial shaft.

9. The apparatus of claim 7, including a third shaft coaxial with said second shaft, a gear train coupling said coaxial shaft and said shaft so as to drive said coaxial shaft at a reduced rate of speed relative to said second shaft, and additional cams carried by said coaxial shaft.

10. The apparatus of claim 4, wherein said commutator is provided with circuit means arranged to energize said motor only when the condition being sensed is within a predetermined condition range.

References Cited in the file of this patent

UNITED STATES PATENTS

| Number | Name | Date |
|---|---|---|
| 25,496 | Farmer | Sept. 20, 1859 |
| 950,555 | Northrup | Mar. 1, 1910 |
| 1,208,228 | Suren | Dec. 12, 1916 |
| 1,303,989 | Suren | May 20, 1919 |
| 1,463,189 | Baker | July 31, 1923 |
| 1,542,096 | Riblet | June 16, 1925 |
| 1,869,909 | Norwood | Aug. 2, 1932 |
| 2,250,712 | Johnson | July 29, 1941 |
| 2,313,626 | Cooper | Mar. 9, 1943 |
| 2,618,694 | Black | Nov. 18, 1952 |
| 2,652,724 | Hidy | Sept. 22, 1953 |
| 2,684,473 | Shannon | July 20, 1954 |
| 2,748,936 | Arlin | June 5, 1956 |
| 2,766,446 | Bland | Oct. 9, 1956 |
| 2,814,201 | Cotton | Nov. 26, 1957 |